United States Patent [19]
Hegedus

[11] Patent Number: 5,128,195
[45] Date of Patent: Jul. 7, 1992

[54] WOVEN CORE STRUCTURE

[75] Inventor: Andreas G. Hegedus, San Francisco, Calif.

[73] Assignee: Hexcel Corporation, Dublin, Calif.

[21] Appl. No.: 492,509

[22] Filed: Mar. 13, 1990

[51] Int. Cl.$^5$ .............................. B05C 3/107
[52] U.S. Cl. ................... 428/174; 428/116; 428/119; 428/120; 428/176; 428/182; 428/180; 428/185; 428/183; 428/184; 428/186; 52/795; 52/798
[58] Field of Search ............ 428/119, 116, 120, 174, 428/176, 182, 180, 185, 183, 186, 184; 52/795, 798

[56] References Cited

U.S. PATENT DOCUMENTS 3,574,103  4/1971  Latkin ................... 428/185
3,869,778  3/1975  Yancey ................... 428/183

Primary Examiner—Ellis P. Robinson
Assistant Examiner—J. Weddington
Attorney, Agent, or Firm—Townsend and Townsend

[57] ABSTRACT

A woven core structure (2) includes a first and second face sheets (4, 6) with inner surfaces (16, 18) facing one another. First and second sets of corrugated ribbons (8, 10) are positioned between the face sheets. The ribbons have nodes (12, 14) which are secured to the inner surfaces of the face sheets. The first set of ribbons extend transversely to, and preferably perpendicular to the second set of ribbons. The first and second sets of ribbons are woven such that the nodes of the first set of ribbons are spaced apart from and generally opposite the nodes of the second set of ribbons. This arrangement permits an increase in the node contact area (26) between the nodes and the face sheets to enhance the bond strength between the ribbons and the face sheets and to increase the skin deformation strength of the structure. The angle between the ribbons and the face sheets can be adjusted to optimize shear strength versus tension/compression strength.

8 Claims, 2 Drawing Sheets

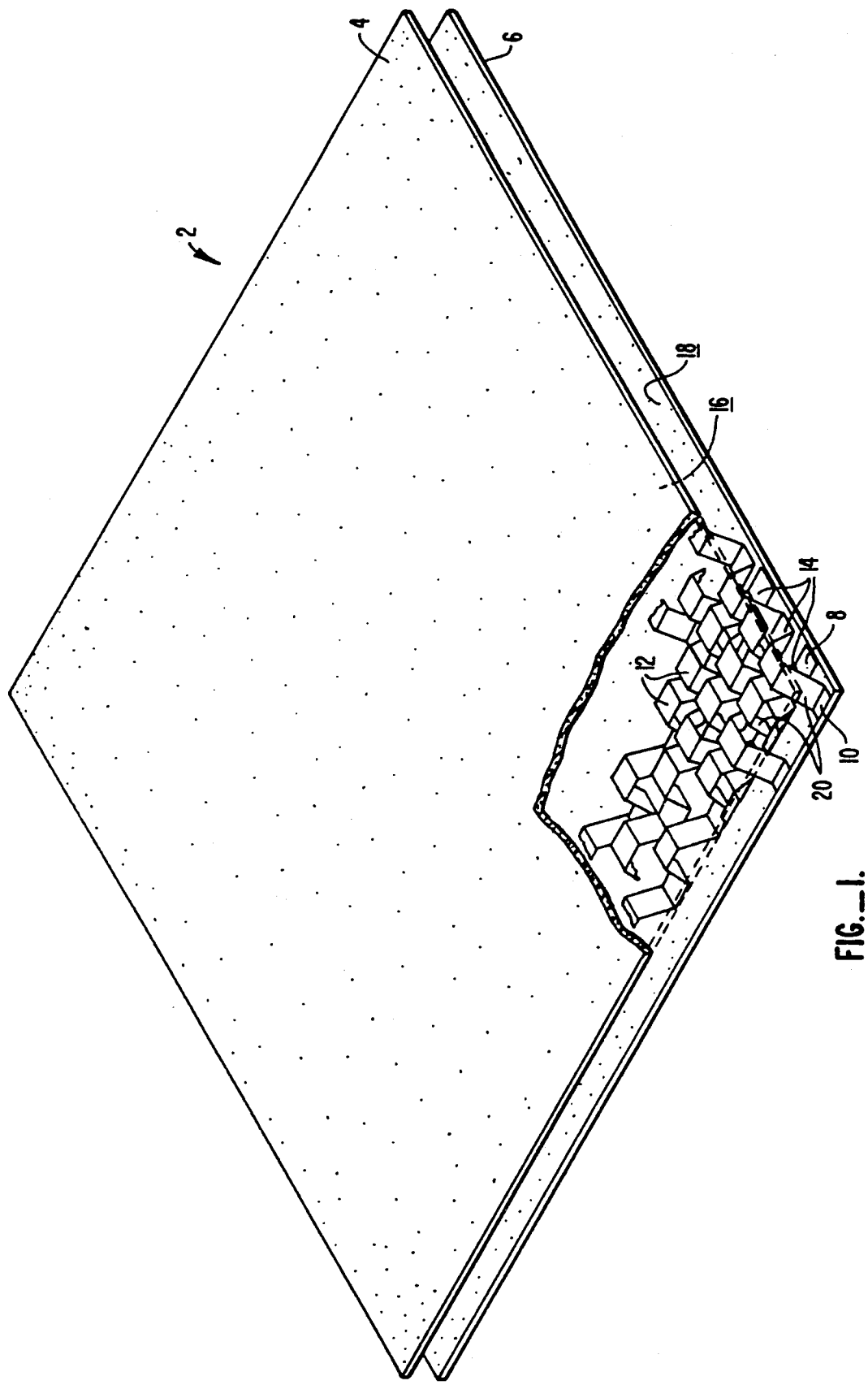

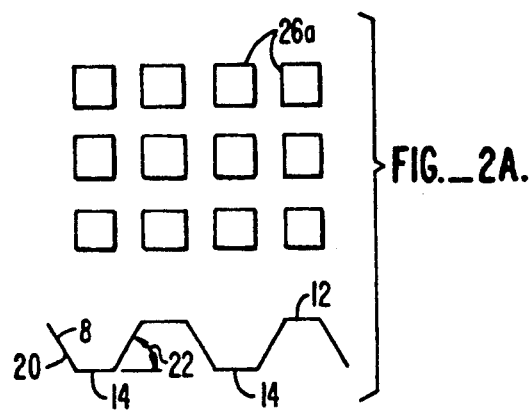
FIG._2A.
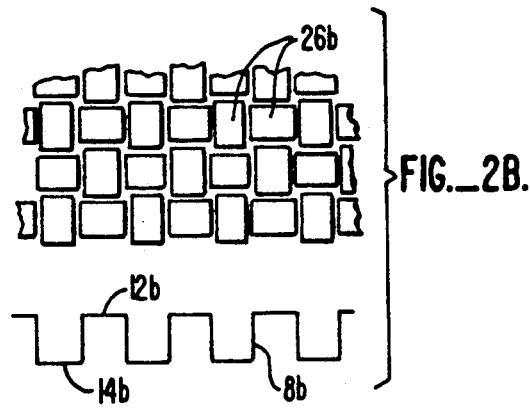
FIG._2B.
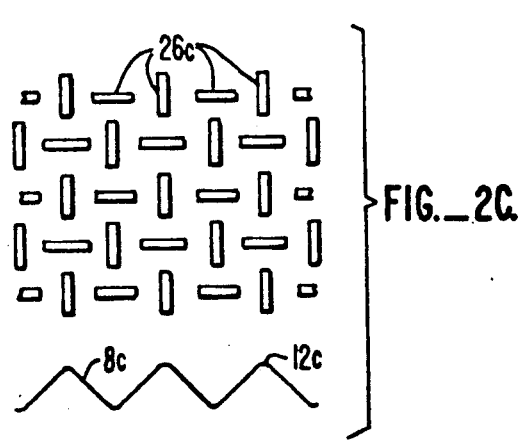
FIG._2C.
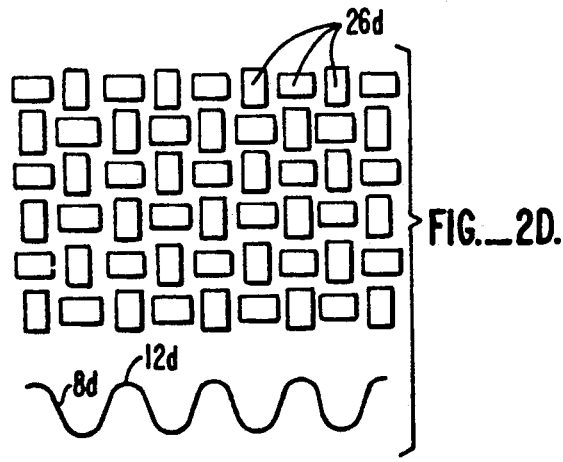
FIG._2D.

WOVEN CORE STRUCTURE

BACKGROUND OF THE INVENTION

Structural panels having high strength to weight ratios are necessary or at least desirable in some operating environments, such as those encountered by aircraft. Instead of using a solid plate or sheet of material, layered structures having face sheets separated by a non-solid core have been used with much success. For example, honeycomb structures, using a honeycomb core sandwiched between two face sheets covering the open ends of the honeycomb cells, have been in use for quite some time. Other high strength to weight ratio structures can be made using various types of expanded materials sandwiched between two face sheets as well.

SUMMARY OF THE INVENTION

The present invention is directed to a woven core structure which maximizes the node contact areas, thus greatly increasing node bond strength and skin deformation strength, while providing for an optimization of shear versus compression/tension strength without increasing bulk and weight.

The woven core structure includes first and second face sheets with inner surfaces facing one another. First and second sets of corrugated ribbons are positioned between the face sheets. The ribbons have nodes which are secured to the inner surfaces of the face sheets. The first set of ribbons extend transversely to, and preferably perpendicular to, the second set of ribbons. The first and second sets of ribbons are interlaced or woven such that the nodes of the first set of ribbons are spaced apart from and positioned generally opposite the nodes of the second set of ribbons. Therefore, the nodes do not lie on top of one another but rather the oppositely positioned nodes are secured to opposite face sheets. The ribbons can be positioned with no or minimal edge contact among the ribbons if this is desired.

A primary advantage of the invention is that the weaving of the corrugated ribbons in a manner that the nodes are arranged opposite one another greatly increases the area of contact between the nodes and the face sheets. This greater contact area increases the bond strength between the ribbons and the face sheets and provides a higher skin deformation strength for the woven core structure.

The present invention is adaptable to optimize shear strength versus compressions/tension strength without increasing bulk and weight. This is achieved by changing the angle the connector portions of the ribbons makes with the face sheets. Making the angle 90° maximizes the compression/tension strength while reducing the angle from 90° towards a saw tooth pattern tends to maximize the shear strength.

Other features and advantages of the invention will appear from the following description in which the preferred embodiments have been set forth in detail in conjunction with the accompanying drawings.

BRIEF DESCRIPTION OF THE DRAWINGS

FIG. 1 is an overall view of a woven core structure made according to the invention; and FIGS. 2A–2D illustrate four exemplary patterns of corrugated ribbons together with exemplary node contact areas.

DETAILED DESCRIPTION OF THE PREFERRED EMBODIMENTS

FIG. 1 illustrates a woven core structure 2 including face sheets 4, 6 having first and second corrugated ribbons 8, 10 between them. Corrugated ribbons 8, 10 include nodes 12, 14 secured to the inner surfaces 16, 18 of first and second face sheets 4,6 respectively. Ribbons 8, 10 have like trapezoidal shapes with connector portions 20 connecting nodes 12, 14. See FIG. 2A.

As is evident from FIG. 1, ribbons 8,10 are woven in a manner such that nodes 12 are generally opposite nodes 14. This permits the total node contact area 26 between nodes 12, 14 and inner surfaces 16, 18 to be maximized. The result of this maximized node contact area 26 is a great increase in the bond strength between ribbons 8, 10 and face sheets 4, 6, as opposed to situations in which the nodes overlap. Also, the greater contact area provides woven core structure 2 with a higher skin deformation strength than would otherwise exist.

Woven core structure 2 also permits the relative shear strength versus the relative tension/compression strength to be varied according to the operational requirements. This is achieved by changing angle 22, shown in FIG. 2A. Increasing angle 22 increases the maximum tension/compression strength while reducing the maximum shear strength. Reducing angle 22 does the opposite, that is reduces the maximum tension/compression strength while increasing the shear strength.

The theoretical limits for these angular differences are shown in FIGS. 2B and 2C. FIG. 2B represents the case where the tension/compression strength is maximized while FIG. 2C represents the case where the shear strength is maximized. FIG. 2D represents a further alternative corrugation pattern for first corrugation ribbon 8. Ribbon 8d has an arcuate cross-sectional shape.

FIGS. 2A–2D also illustrate typical node contact areas 26a–26d. In the embodiment of FIG. 2A, the space between the nodes 12 is based upon the width of ribbon 12 and angle 22. In the embodiment of FIGS. 1 and 2A, the width of the ribbons are taken to be equal to the length of nodes 12, 14 so that node contact areas 26 and 26a are square as suggested in FIGS. 1 and 2A. In the embodiment of FIG. 2B, the width of the corrugated ribbons is slightly less than the length of the nodes so that node contact areas 26b are rectangular but not square. FIGS. 2C and 2D illustrate typical node contact areas 26c, 26d for those embodiments.

In making core structure 2, ribbons 8,10 are corrugated and a conventional continuous weaving process may be used to weave corrugated ribbons 8,10 with nodes 10,12 spaced apart and opposite one another. The width of ribbons make the woven core generally self-supporting. The woven core is fed onto a lower platform (not shown) for support. An adhesive is applied to nodes 12 and face sheet 4 is applied to and adhered to nodes 12. The woven core with upper face sheet 4 secured thereto is removed from the platform, an adhesive is applied to nodes 14 and face sheet 6 is secured to nodes 14. Other methods of manufacture may be used as well.

The material from which ribbons 8,10 as well as face sheets 4,6 are made is chosen according to the particular requirements. Face sheets 4,6 and ribbons 8,10 can be made of a variety of materials, including metals, plastics, ceramics or a combination. Structure 2 may be impregnated with an appropriate thermosetting or thermoplastic resin and may have the open spaces between face sheets 4,6 filled with a low density material, such as foam, as well. In the preferred embodiment ribbons 8,10 and face sheets 4,6 are made of steel or aluminum about 0.5 mm thick, ribbons 8,10 are about 2.5 mm wide and face sheets 4,6 are about 6 mm to 12 mm apart.

Other modifications and variations may be made to the disclosed embodiments without departing from the subject of the invention as defined in the following claims. For example, ribbons 8 may be the same or a different size and/or shape as ribbons 10. Further, each ribbon 8 need not be the same as each other ribbon 8. In the preferred embodiment ribbons 8,10 are arranged perpendicular to one another. Although to be woven ribbons 8,10 need to be transverse to one another, they need not to be arranged perpendicular to one another.

What is claimed is:

1. A woven core structure having a high strength to weight ratio comprising:
   first and second face sheets having inner and outer surfaces, said inner surfaces facing one another;
   first and second corrugated ribbons extending in first and second directions, the first direction being transverse to the second direction;
   the ribbons each including nodes secured to the inner surfaces of the first and second face sheets; and
   the first and second ribbons being woven with the nodes of said first set of ribbons spaced apart from and positioned generally opposite the nodes of said second set of ribbons.

2. The structure of claim 1 wherein the face sheets are flexible.

3. The structure of claim 1 wherein the first direction is perpendicular to the second direction.

4. The structure of claim 1 wherein the first and second ribbons have the same corrugated shape.

5. The structure of claim 1 wherein the first ribbons all have the same corrugated shape.

6. The structure of claim 1 wherein the first ribbons each have trapezoidal corrugated shape.

7. The structure of claim 6 wherein the first ribbons have generally flat nodes connected by connector portions, the connector portions defining an angle with the face sheets, the angle chosen according to the relative strengths desired in shear and in compression/tension.

8. A woven core structure having a high strength to weight ratio comprising:
   first and second flexible face sheets having inner and outer surfaces, said inner surfaces facing one another;
   first and second corrugated ribbons extending in first and second directions, the first direction being perpendicular to the second direction;
   the ribbons each including nodes secured to the inner surfaces of the first and second face sheets;
   the first and second ribbons being woven with the nodes of said first set of ribbons spaced apart from and positioned generally opposite the nodes of said second set of ribbons; and
   the first ribbons having generally flat nodes connected by connector portions, the connector portions defining an angle with the face sheets, the angle chosen according to the relative strengths desired in shear and in compression/tension.

* * * * *